United States Patent [19]

Kallstrom

[11] Patent Number: 5,735,410
[45] Date of Patent: Apr. 7, 1998

[54] STAND FOR VEHICLE WHEEL

[76] Inventor: Ervin C. Kallstrom, 55 W. Hoover #11, Mesa, Ariz. 85210

[21] Appl. No.: 713,004

[22] Filed: Sep. 12, 1996

[51] Int. Cl.⁶ .................................................. A47F 5/00
[52] U.S. Cl. ........................ 211/20; 211/5; 224/924; 70/235
[58] Field of Search ............................... 211/5, 17, 20, 211/22; 224/924, 403; 70/234, 235

[56] References Cited

U.S. PATENT DOCUMENTS

| 3,912,139 | 10/1975 | Boaman | 222/403 X |
| 4,269,049 | 5/1981 | Henderson | 211/5 X |
| 4,437,597 | 3/1984 | Doyle | 211/20 X |
| 4,700,873 | 10/1987 | Young | 224/924 X |
| 4,852,779 | 8/1989 | Berg | 224/924 X |
| 4,921,152 | 5/1990 | Kemming | 224/924 X |
| 5,301,817 | 4/1994 | Merritt | 211/5 |
| 5,435,475 | 7/1995 | Hudson et al. | 224/924 X |

*Primary Examiner*—Robert W. Gibson, Jr.
*Attorney, Agent, or Firm*—Gregory J. Nelson

[57] ABSTRACT

A stand for locking the front wheel of a vehicle, such as a motorcycle, in a stable position. The stand has front and rear support mechanisms which, in a preferred embodiment, are actuated by a ramp so that the weight of the front wheel of the motorcycle as it is rolled onto the ramp will actuate the front and rear supports to engage the tire at locations forward and rearward of the wheel axis of rotation.

9 Claims, 5 Drawing Sheets

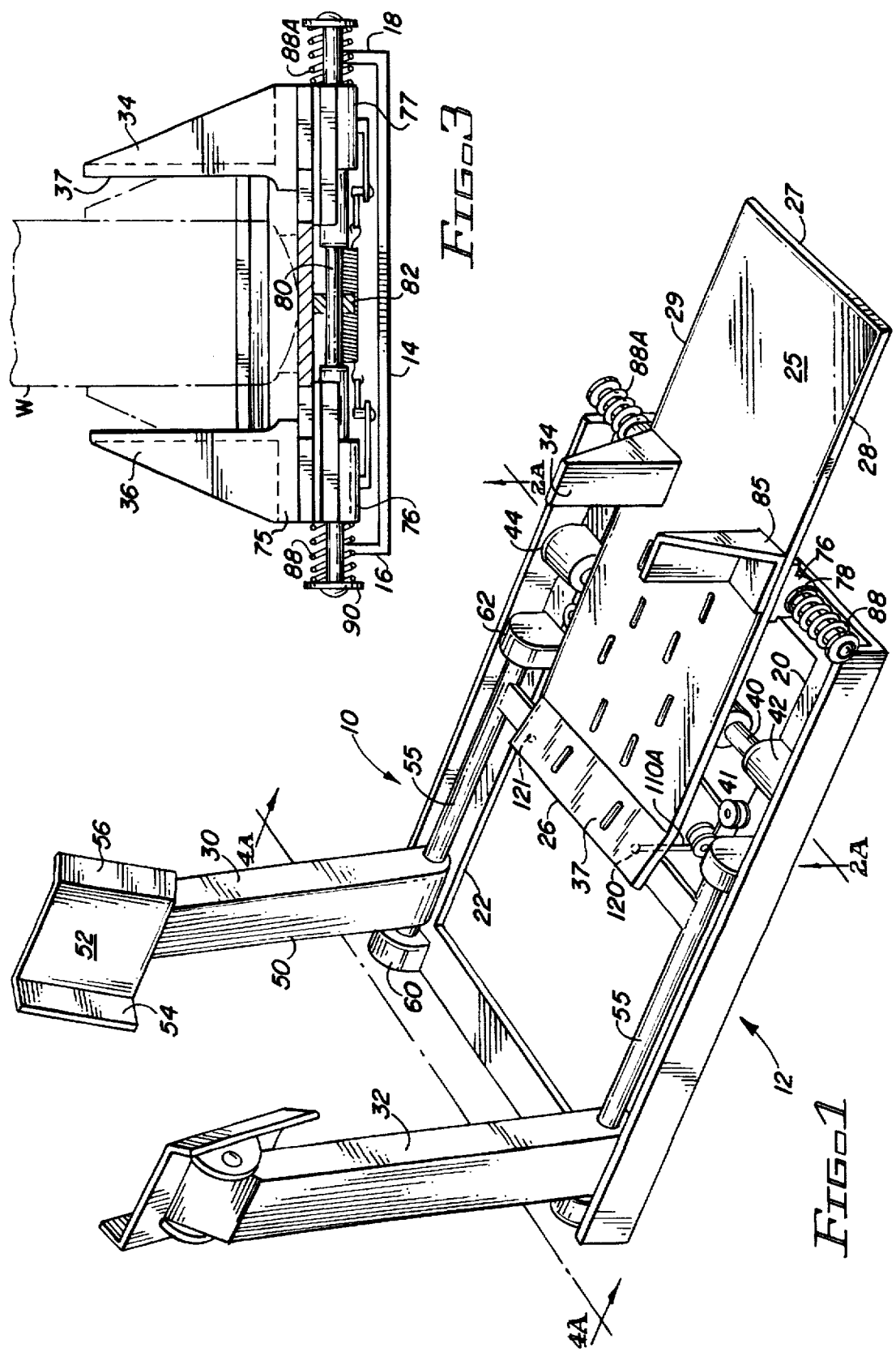

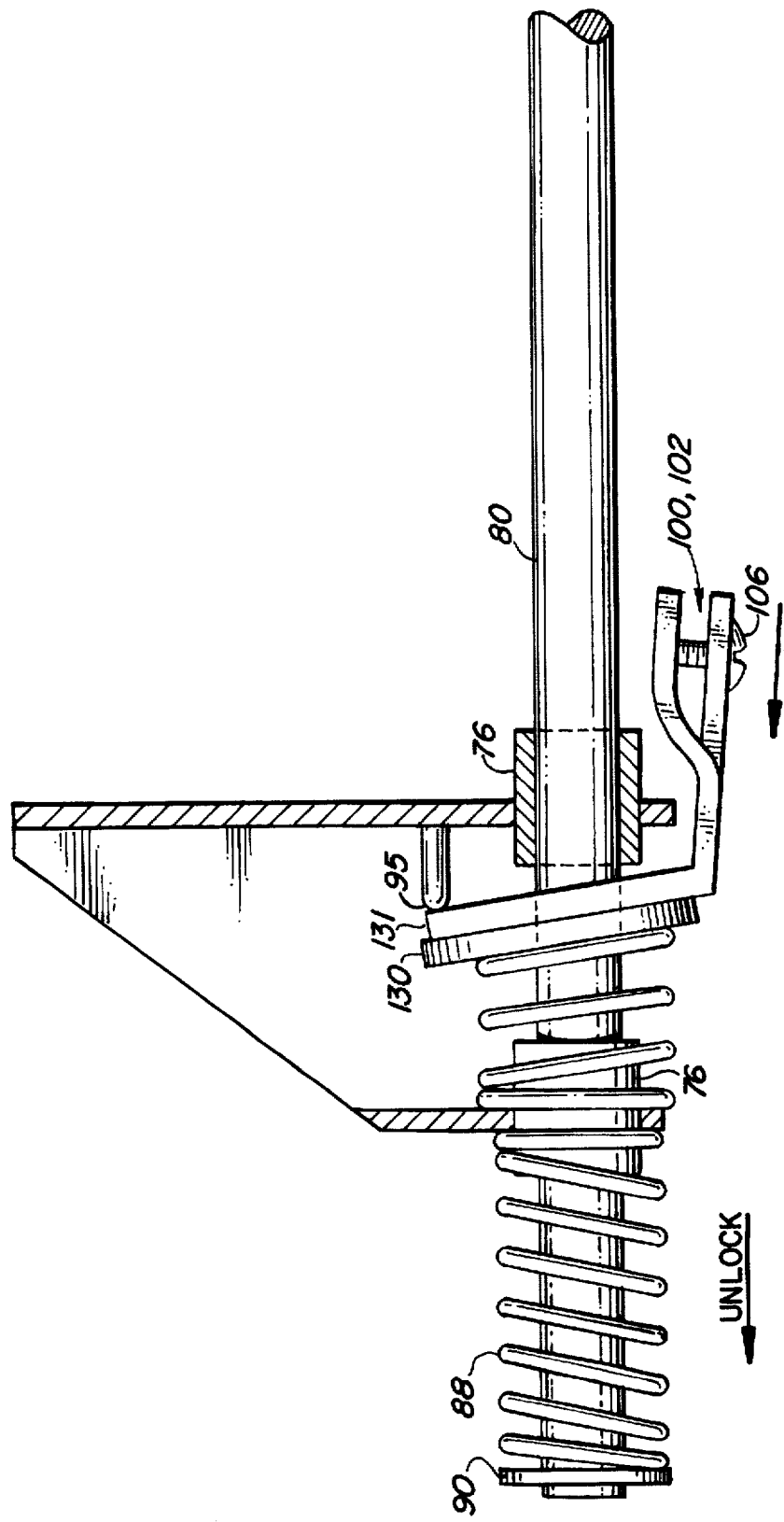

STAND FOR VEHICLE WHEEL

BACKGROUND OF THE INVENTION

Field of the Invention

The present invention relates to a stand or rack, or more particularly relates to a stand for supporting a vehicle such as a motorcycle in a locked, generally vertical position by engagement with the front vehicle wheel.

When trailering or towing vehicles, such as motorcycles, it is generally necessary to immobilize the motorcycle in an upright, rigid position during transportation on a truck, trailer or towing hitch for safety and to prevent damage. Larger motorcycles present a particular problem as they are heavy and difficult to maneuver into prior art towing and hitch devices.

The prior art discloses a number of hitches of this general type.

Gibson, U.S. Pat. No. 2,489,771, discloses a cycle hitch that mounts to an auto bumper. The device includes two upright frames, each having a vertical portion hinged to a horizontal portion and adapted to be retained in position by a collapsible bracket. The cycle wheel is rolled onto the horizontal portions of the devices and pairs of hooks pivotally mounted to the vertical and horizontal portions are extended over and into engagement with the motorcycle wheel rim.

Holland, U.S. Pat. No. 2,988,382, discloses a motorcycle trailer having a channel with upwardly extending side walls which receive the wheels of the motorcycle and has brackets and hooks for securing the motorcycle in an upright position in the channel.

McCance, U.S. Pat. No. 3,428,332, discloses a motorcycle towing apparatus which includes a wheel carrier having an elongated sleeve and one or more cradles mounted thereto.

Jones, U.S. Pat. No. 3,430,983, discloses a motorcycle hitch which has a V-shaped draw bar, a carrier frame pivotally connected to the draw bar, an upright post at the vertical connection and a front tire clamping shoe mounted to the post to clamp the front portion of the front wheel. A rear clamping shoe is pivotally mounted on the carrier frame to receive the front wheel of a motorcycle and rocks forward to support the tire forwardly of the pivot axis of the shoe at which position it is clamped by the front clamping shoe. A hook is provided to latch the rear clamping shoe in the clamping position.

Harris, U.S. Pat. No. 3,615,105, discloses a motorcycle hitch which includes a cylindrical tube which is attached to and supports the front fork of the motorcycle with the front wheel removed.

Winder, U.S. Pat. No. 3,711,120, discloses a motorcycle trail hitch which couples with the front fork of the motorcycle with the front wheel removed.

Coyle, U.S. Pat. No. 3,740,074, discloses a motorcycle towing device having a mounting bracket assembly attached to the rear of the towing vehicle and including elongated channels for supporting the wheels and main springs mounted laterally thereof.

Brajkovich, U.S. Pat. No. 3,785,517, discloses a motorcycle carrier and chock which includes a base plate and a main holder for the front wheel in the form of an arcuate-shaped sheath-like channel having a reversed curved entry ramp.

Hancock, U.S. Pat. No. 4,111,449, discloses a quick detachable bumper hitch adapted to engage the axle of the front wheel of a motorcycle for lifting and towing thereof.

Von et al, U.S. Pat. No. 5,145,308, discloses a motorcycle towing device having a support bar, a ramp pivotally connected to the rear end of the support bar, a wheel cradle pivotally mounted upon the support bar for pivoting rearwardly to receive the front wheel of the motorcycle and forward to support the wheel at which position the cradle is latched by a hook.

Thus, considering the prior art which is represented by the above patents, a number of hitches or stands for securing vehicles such as motorcycles in a towing or transportation position can be found. However, a number of deficiencies exist with prior art designs. The devices of the prior art are either cumbersome, difficult to manufacture or do not adequately support the motorcycle wheel in a vertical, locked and rigid position. Also, many of the prior art stands or towing devices are not designed for use with large motorcycles.

BRIEF SUMMARY OF THE INVENTION

Briefly, the present invention relates to a stand or wheel locking device, particularly for use when trailering or towing motorcycles. The stand has front and rear support mechanisms cooperating with one another such that the weight of the front wheel of the motorcycle, when acting on a pivotal ramp and through mechanical components, causes the front support mechanism to hold the front portion of the wheel stationary while the rear support mechanism comprising a pair of clamps on the ramp engage the rear portion of the front wheel.

More particularly, the present invention includes a forward support mechanism for holding in a stationary, vertical orientation, a motorcycle wheel-mounted tire at front opposite sides, forwardly of the axis of rotation. The forward support mechanism comprises an upright arm and lower inwardly extending lever at opposite sides of the wheel. The arm and lever are pivotally mounted so that as the weight of the front tire acting upon the lever and applying downward pressure will cause the upright arms to inwardly close and engage the opposite sides of the front tire, forward of the front axle.

A rear support mechanism is also provided for securing the motorcycle front tire in a stationary, vertical position at rear opposite sides, rearwardly of the axis of rotation. The rear support mechanism includes a lower ramp having a pair of reciprocable jaws mounted along opposite sides of the rearward portion of the ramp which engage the rear opposite sides of the tire. A shaft is mounted below the ramp and pivotally supports the ramp. The jaws are moved transversely by a pair of levers actuated by a cable system connected to the ramp. The jaws each include a clutch mechanism which secures the jaws in the proper position for the tire width but which allows the jaws to be released when the motorcycle is to be unloaded. The stand is useable by itself as a parking stand or may be mounted on a trailer or vehicle bed. When the front wheel is engaged by the front and rear supports, it is locked so that it will not roll, nor rotate about the steering axis.

BRIEF DESCRIPTION OF THE DRAWINGS

The present invention will be more fully understood from the following description, claims and drawings in which:

FIG. 1 is a perspective view of the wheel locking mechanism of the present invention shown in an open position ready to accept the motorcycle wheel;

FIG. 3 is a rear view of the stand of the present invention with a representative motorcycle tire being shown in dotted lines and with dotted lines representing the closed position of the jaws of the rear support mechanism;

FIG. 7 is a detail view of the clutch associated with each of the rear support mechanisms.

DETAILED DESCRIPTION OF THE DRAWINGS

Figure 4A:
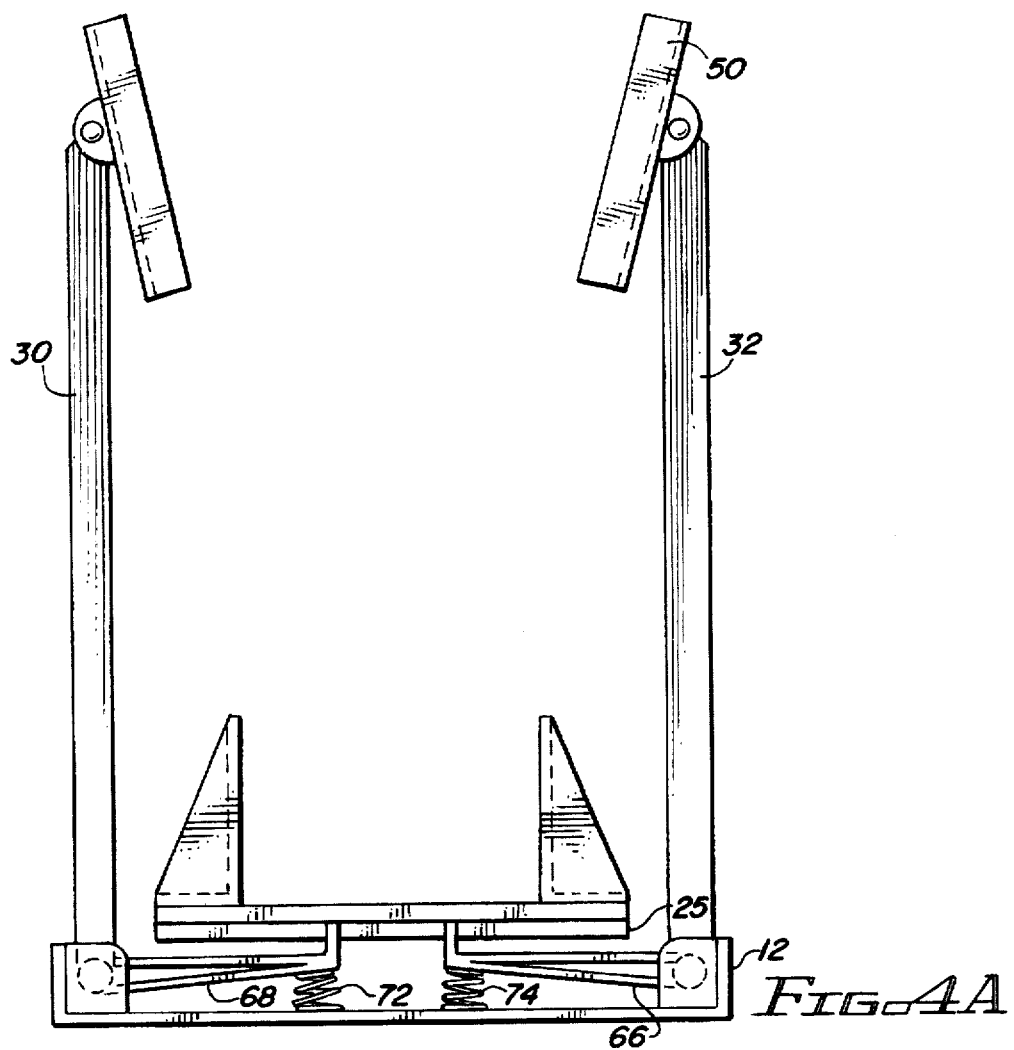
FIG. 4A is a front view of the stand with the front and rear support mechanism being shown in an open position.

At the outset it is helpful to understand the steering geometry of motorcycles. The present invention may be used to stabilize vehicle wheels of various types such as bicycles, but is particularly intended for use with motorcycles. The caster and camber, the trailing and leading of the front wheel of motorcycles, is accomplished by leaning the vertical angle of the front fork a prescribed number of degrees from the vertical to the rear. Each motorcycle manufacturer establishes this angularity with respect to its particular design. Accordingly, the motorcycle rider may simply lean on the motorcycle at low speeds and front wheel will be directed in the direction of the lean.

In order for a motorcycle stand to function properly, it is necessary to stabilize the motorcycle in a position as close to vertical as possible. This is because the weight of the motorcycle tends to topple the motorcycle even at relatively small angular displacements from vertical. With the present invention, the weight of the motorcycle is used to maintain the motorcycle in a vertical, stable position. This assists the rider in the necessary tie-down and allows an individual to load a large, heavy motorcycle onto a trailer without assistance.

Accordingly, the stand of the present invention may be used as a stationary stand or may be used in conjunction with a trailer or other transport. Accordingly, it may be suitably mounted on or made an integral component to be attached to the deck of a trailer. Once the front wheel is stabilized in a vertical position, the rear of the motorcycle may be tied down in conventional manner using ropes or bungee cords. With the present invention, the front wheel is stabilized at positions fore and aft of the front axle, thus locking the wheel against twisting or rotation.

Turning now to the drawings, the motorcycle stand of the present invention is generally designated by the numeral 10 and includes a base 12 which has a general planar bottom 14 and upstanding parallel and longitudinally extending side rails 16 and 18. Portions of the base 14 may be provided with relieved areas, such as cut-outs 20, 22 to accommodate access to the mechanical components and to facilitate assembly and maintenance.

The base is formed of a suitable material such as a heavy gauge steel and may vary in size depending upon the intended use, although for most motorcycle applications, the base will be about 12" to 24" in length and approximately 6" to 12" in width.

As indicated above, the device utilizes the weight of the front of the motorcycle to operate the stand and maintain the motorcycle in a vertical position. Accordingly, a ramp 25 operates to actuate the front tire-engaging supports 30 and 32 and the rear tire-engaging supports 34 and 36.

The ramp 25 is shown as being generally rectangular having a front edge 26, rear edge 27 and opposite side edges 28 and 29. The ramp is of a suitable heavy-gauge steel and is generally planar having an upwardly curved or inclined, forward lip 37. The surface of the ramp plate may be provided with areas such as projections 38 to increase the frictional engagement with the tire of the motorcycle.

The ramp is mounted on transversely extending shaft 40 which has opposite ends which are received in lugs 42, 44 at the opposite sides 16 and 18 of the frame. The forward edge 26 of the ramp extends to an intermediate location with respect to the frame and the rear edge 27 projects beyond the edge of the frame to accommodate loading the front motorcycle wheel. The shaft 40 extends through journal bearing 41 on the underside of the ramp to facilitate pivotal movement of the ramp.

The front tire-engaging supports 30, 32 are similarly constructed and each has a vertically extending arm 50 which carries a pad 52 at its upper end. The rear of the pad 52 is secured to the upper end of the arm 50 at pivot pin 54. The pads 52 may be generally flat or may be somewhat S-shaped each having an inwardly extending lip 54 at its forward end to constrain the tire and a diverging lip 56 at its opposite end which serve to assist to properly guide the tire into position.

Figure 5:
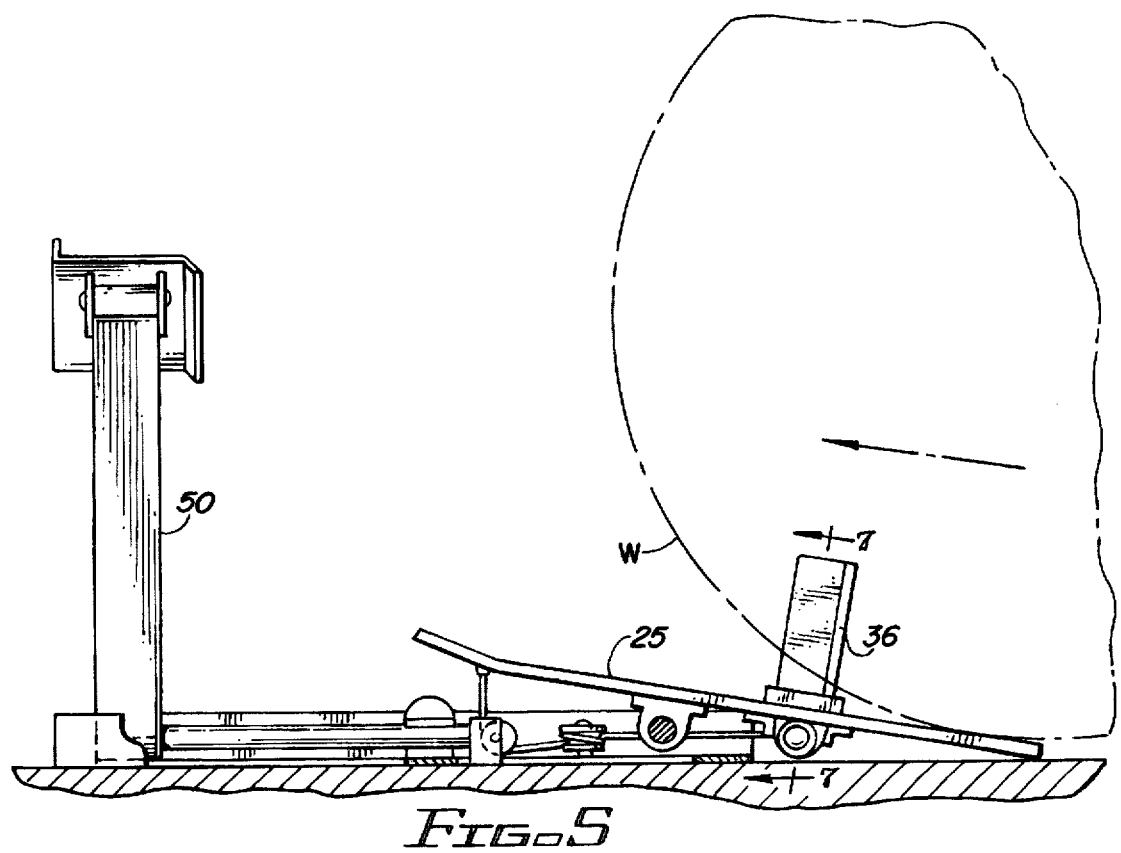
FIG. 5 is a side view of the stand with a wheel shown in dotted lines, first entering the ramp of a platform.
Figure 6:
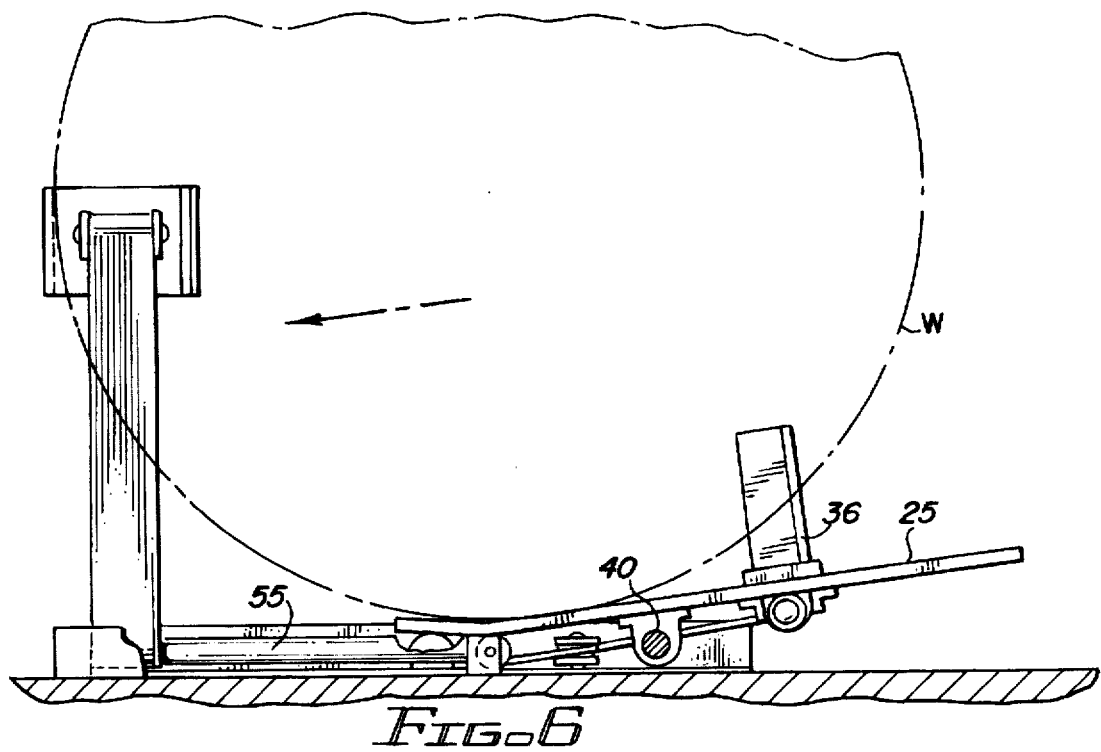
FIG. 6 is a view similar to FIG. 5 with the wheel being shown in dotted in a forward position in which the forward and rear support mechanisms are in a closed, tire-engaging position.

The lower end of arms 50 are each connected to a longitudinally extending pivot shaft 55 arranged at opposite sides of the frame immediately inward of the side rafts 16 and 18. The pivot shafts 55 are secured for rotation in journals 60 and 62 so that the front tire-engaging supports 30, 32 may be moved from a generally vertical, open position as shown in FIG. 4A to the closed position shown in FIG. 4B. Secured to the shafts 55 at an intermediate location along the frame are a pair of inwardly extending lever arms 66 and 68. The outer ends of the arms 66, 68 are fixedly secured to the shafts 55. The inward ends of the arms 66, 68 extend to a location below the forward end 26 of the ramp 25 and each have an upwardly extending flange 70 which is biased into engagement with the underside of the ramp by a pair of compression springs 72 and 74. The compression springs will normally urge the forward end of the ramp upwardly to the position shown in FIGS. 4A and 5 and as the wheel first engages the ramp, the front supports will open. It will be seen that when the weight of a motorcycle wheel "W" is forwardly positioned on the ramp as shown in FIG. 6, the ramp will be caused to pivot counterclockwise. The counterclockwise rotation of the ramp will depress lever arms 66 and 68 causing the shafts 55 to inwardly rotate, bringing the front tire-engaging supports 30, 32 to the position shown in FIG. 4B in which the pads 52 engage the opposite sides of the tire mounted on the wheel "W". In this position, the forward supports acting at a location forward of the axis of rotation of the motorcycle wheel will help to stabilize the motorcycle wheel in a vertical position. As the wheel "W" moves forwardly from the entry end 27 of the ramp to the forward end, the ramp will be pivoted downwardly causing the forward tire-engaging supports to close against the opposite sides of the tire. When the motorcycle is rolled rearwardly off the ramp, the force created by the compression springs 72, 74 will act to rotate the ramp upwardly or clockwise to the open position shown in FIG. 4A.

The motorcycle wheel "W" is also secured at a location rearwardly of the front axle of the motorcycle by rear tire-engaging supports which engage the tire at a location below the engagement location of the front supports. The front and rear supports cooperate to stabilize and lock the wheel. The rear supports include oppositely-disposed, reciprocable clamps 34, 36, each of which have a generally vertical tire-engaging face 37 and a horizontal base 75 to which is attached sleeves 76, 77 having a transversely extending bore 78. A transversely extending shaft 80 is secured to the underside of the ramp by means of projection 82. The shaft or rod 80 extends through the bores in the oppositely disposed clamps so that the clamps 34, 36 are slidable along the rod 80. The opposite sides of the ramp plate 25 are notched at 85 to accommodate transverse reciprocation of the clamps 34 and 36. Compression springs 88, 88A extend between the clamps and a retaining washer 90 at opposite ends of the shaft 80. Note the springs engage plates 130, 131 which, in turn engage a projection 95 on the clamps 34, 36 as will be more fully described below with reference to FIG. 7.

Figure 2A:
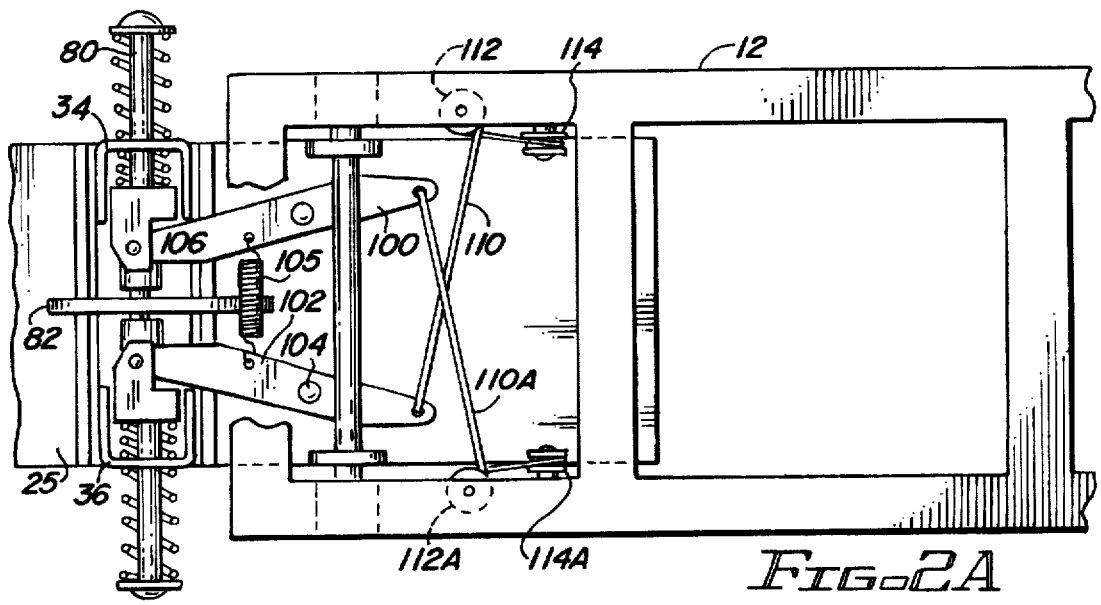
FIG. 2A is a bottom view of a portion of the stand beneath the ramp with the rear support mechanism shown in a closed position.
Figure 4B:
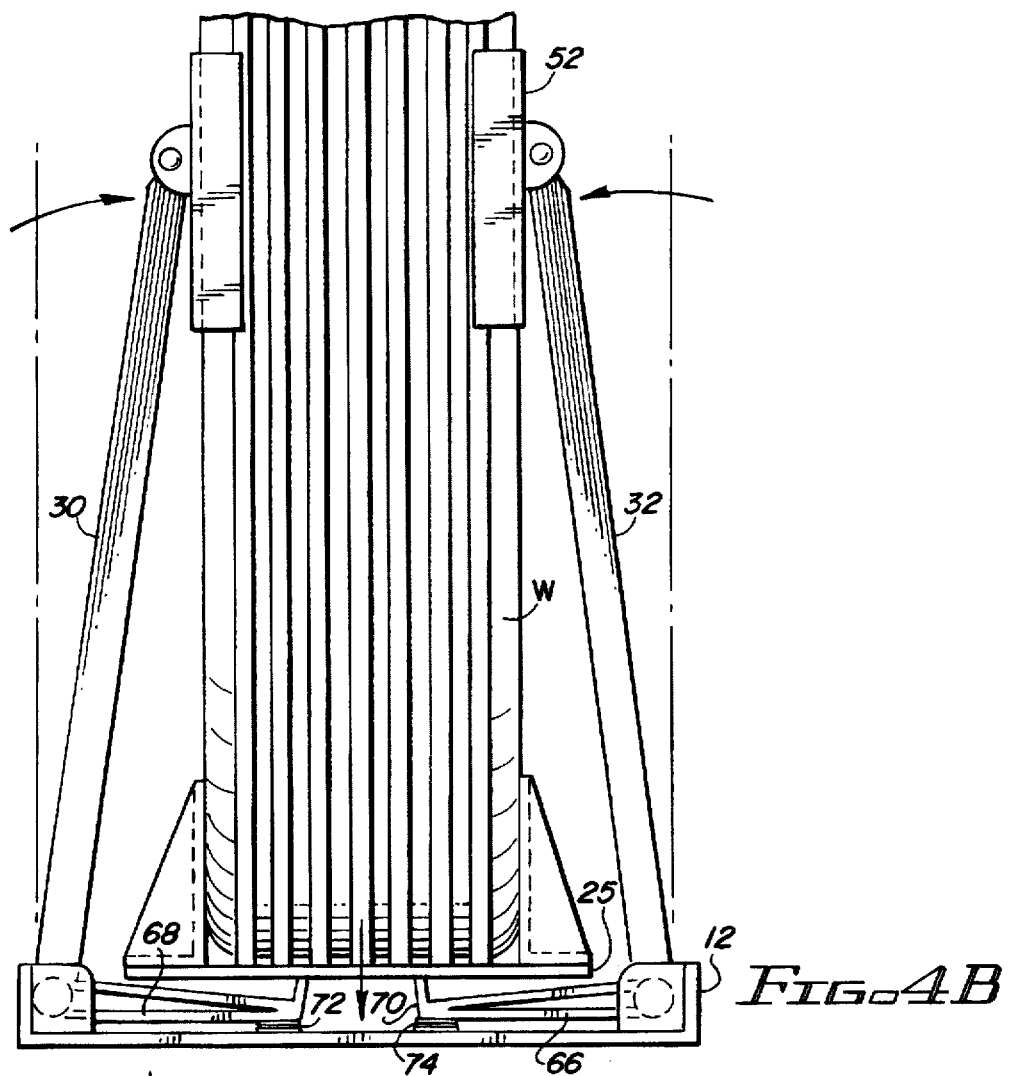
FIG. 4B is a view similar to FIG. 4A with the front and rear supports shown in a closed, tire-engaging position.
Figure 2B:
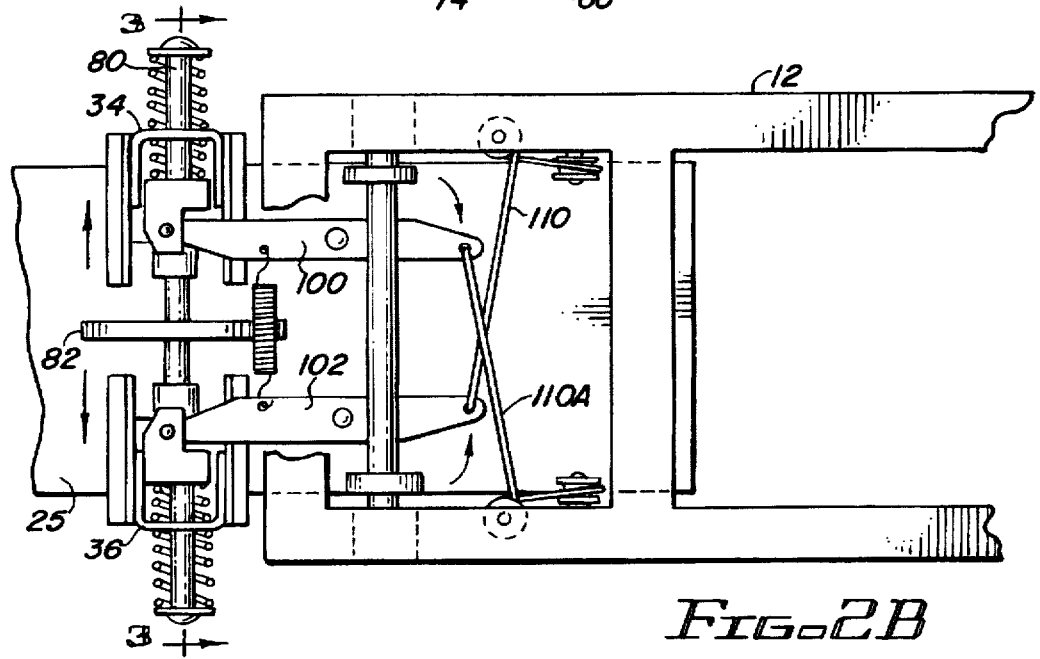
FIG. 2B is a view similar to FIG. 2A with the rear support mechanism shown in a closed, tire-engaging position.

The rear tire-engaging jaws 34, 36 are movable between the open position shown in FIG. 3 and the closed position shown in FIG. 4B by means of a lever arrangement as best seen in FIGS. 2A and 2B. The lever arrangement includes a pair of lever arms 100, 102, each pivotally attached to the underside of the ramp plate at pivot point 104. One end of each of the levers 100, 102 are pivotally connected to the plates 131, respectively. The pivotal connection is designated as pivot 106. The levers 100, 102 are interconnected by a spring 105 so that the rear ends of the levers are biased inwardly to the position shown in FIG. 2A. The forward end of lever 102 is connected by a cable 110 around a horizontal pulley 112 and vertical pulley 114 and is tied-off or secured to the underside of the ramp at 120. Similarly, the opposing lever 100 is secured by cable 110A which is disposed around horizontal roller or pulley 112A and around vertical pulley or roller 114A and is tied-off or secured to the underside of the ramp at 121.

The normal or rest state of the device is shown in dotted lines in FIG. 3 in which the springs 88, 88A bias or force the jaws or clamps 34, 36 to the inner-most position which is accommodated by the opposite slots 85 in the ramp plate. As the front wheel of the motorcycle is rolled onto the front edge 27 of the ramp, the weight of the motorcycle forces the rear end of the ramp plate downward. The front end of the ramp moves upwardly causing the cables 110, 110A to tighten and through the levers, the jaws are forced outwardly to accommodate the entry onto the ramp of the motorcycle wheel and tire.

FIG. 7 shows a detail view of the transverse locking shaft 80 and one of the jaws 34, it being understood that the opposite jaw 36 is similarly constructed. A clutch locking mechanism is provided by plates 130 and 131, each of which have bores which have a diameter greater than the rod 80. The locking rod 80, as described above, is secured to the underside of the ramp base plate. The spring 88 applies an inwardly directed biasing force against the locking plates which plates are held against further inward movement by the projection 95 extending from the jaw 34. The lower end of the clutch locking plates 130, 131 will move inwardly until the inner surface of their respective bores come into frictional, binding engagement with the locking rod, resisting any force tending to push the jaw outwardly.

It can be seen that this construction provides a simple one-way clutch arrangement. This clutch operates to lock the front motorcycle tire in place and restrain sideways movement. When outward force is applied in the direction of the arrow, the clutch locking plates 130, 131 will be forced against the spring 88 and the lower part of the jaw 34. This force will operate to compress the spring 88 forward to re-load the mechanism for the next operation.

When the motorcycle wheel moves forward of the pivot axis of pivot shaft 40, the ramp will rotate downwardly decreasing the tension on both cables 110, 110A. The resultant slack is taken up by the springs which causes the jaws to come into contact with the sides of the tire. Further inward movement of the levers results in locking action taking place. This movement automatically brings the jaws into proper locking position with the tire, regardless of its width. The locked condition is released by applying downward pressure on the motorcycle handlebar. Simultaneously, the front tire-engaging supports are rotated into engagement with the tires at an elevation approximately corresponding to the height of the axle and forward of the axle.

Thus, it will be seen that the present invention provides an effective support for securing a motorcycle in a stable, vertical position for storage or transportation. The device is simple and is operated by the weight of the tire as it moves along the ramp plate.

The stand has been described with reference to both forward and rear supports, each having an opposed pair of moveable clamping or jaw components. It is possible to fix jaws 34 and 36 on plate 25 and utilize only moveable supports at the forward position. This design is not as effective, particularly with larger tire sizes, but will work with stands for use for stabilizing smaller motorcycles.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A stand for securing the front tire-supporting wheel of a two-wheeled cycle in a stabilized, upright position, said stand comprising:

(a) a base having opposite sides and a forward and a rear end;

(b) a wheel-receiving ramp pivotally mounted on a base, said ramp being pivotal between a wheel loading and a loaded position;

(c) a pair of oppositely disposed forward support means pivotally mounted on the opposite sides of said base, said forward support means movable between an open and a closed tire-engaging position;

(d) first actuating means interconnecting said ramp and said forward support means for moving said forward support means to said closed tire-engaging position when said ramp is pivoted to said loaded position;

(e) a pair of oppositely disposed rear support means mounted on said ramp and movable between a first and a closed tire-engaging position; and (f) second actuating means interconnecting said ramp and said rear support means and operable to move said rear supports from said first to said closed position when said ramp is pivoted to said loaded position with said wheel thereon.

2. The stand of claim 1 wherein said first actuating means comprises lever means extending between said forward tire support means and said ramp and wherein said forward support means each comprise arm means pivotally mounted on said base about a longitudinal axes.

3. The stand of claim 1 further including one-way clutch means associated with each of said pair of rear support means for releasably securing said rear tire support means in said tire-engaging position.

4. The stand of claim 1 wherein said second actuating means comprises a pair of lever arms pivotally secured to said ramp and each lever arm having a first end operatively attached to a respective one of said rear tire supports and having a second end attached to a cable, the opposite end of which is tethered to said ramp.

5. The stand of claim 1 wherein said ramp has a generally planar rear end and an upwardly inclined forward end.

6. The stand of claim 1 wherein said forward support means are positioned to engage said tire at a position forward of and at a height approximately corresponding to the height of the rotational axis of the wheel.

7. The stand of claim 1 wherein said rear tire support means are positioned to engage said tire at a position rearward and below the wheel rotational axis.

8. A stand for securing the front wheel of a tire-supporting motorcycle wheel in a generally vertical, stable position, said stand comprising:

(a) a base having opposite sides and opposite ends;

(b) a wheel-receiving ramp pivotally mounted on a base, said ramp being pivotal between a wheel loading and a loaded position;

(c) a pair of oppositely disposed forward support means pivotally mounted on the opposite sides of said base at a support means movable between an open and a closed tire-engaging position;

(d) first actuating means interconnecting said ramp and said forward support means for moving said forward support means to said closed tire-engaging position when said ramp is pivoted to said loaded position; and (e) rear support means positioned to engage the wheel at a location rearward of the rotational axis of the wheel.

9. A stand for securing the front wheel of a tire-supporting motorcycle wheel in a generally vertical, stable position comprising:

(a) a base having opposite sides and a forward and rear end;

(b) a wheel-receiving ramp having a forward and a rear end, said ramp being pivotally mounted with respect to said base with the forward ramp end extending to an intermediate location on said base and the rear end extending rearwardly of the rear of the base;

(c) a pair of upwardly extending arms oppositely disposed at opposite sides of the base and being on shafts pivotally mounted to said base, said arms each having tire-engaging means positioned to engage said tire at a location forward of and approximately at the elevation of the wheel axis of rotation;

(d) lever means extending from each of said shafts to a location below said ramp, said lever means being biased into engagement with said ramp whereby downward rotation of the front end of said ramp due to the weight of a wheel being positioned therein, will cause said arms to pivot bringing said tire-engaging means into a closed tire-engaging position;

(e) first and second oppositely disposed clamps located on said ramp at an intermediate location, said clamps being moveable between an open and a closed position;

(f) first and second lever means pivotally mounted on said ramp, said first lever having a first end in operative engagement with said first clamp and having a second end, said second lever having a first end in operative engagement with said second clamp and having a second end;

(g) cable means securing said second ends of said first and second lever means to said ramp whereby downward rotation of the rear end of said ramp will move said clamps to an open position and downward rotation of the forward end of said ramp due to the weight of motorcycle wheel thereon will bring said clamp into opposite engagement with the tire rearward of the axis of rotation; and (h) one-way clutch means associated with each of said clamps whereby said clamps are releasably held in a tire-engaging position.

* * * * *